…

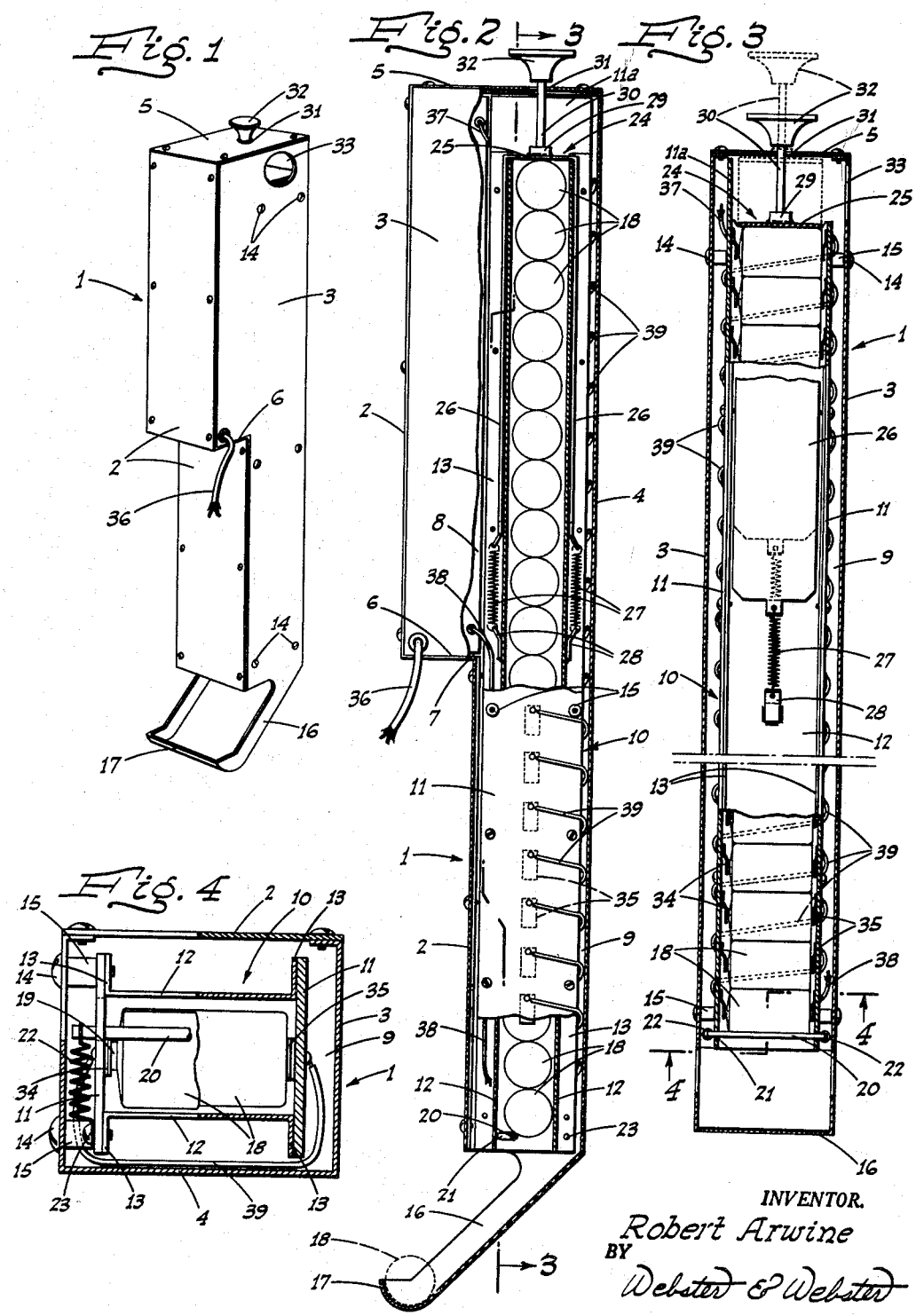

United States Patent Office 3,171,568
Patented Mar. 2, 1965

3,171,568
BATTERY RECEIVING, CHARGING, AND
DISPENSING DEVICE
Robert Arwine, % Electro Sonic Control,
1625 N. Main St., Manteca, Calif.
Filed Nov. 3, 1961, Ser. No. 149,916
3 Claims. (Cl. 221—66)

This invention is directed to, and it is a major object to provide, a novel device adapted to receive, charge, and dispense flashlight batteries or cells of the rechargeable type; such device being advantageous to law enforcement officers or others who, in their line of work, have a frequent demand for freshly charged flashlight batteries.

Another important object of the invention is to provide a device, as above, wherein a multiplicity of rechargeable flashlight batteries are disposed and charged in a row; the introduction of a spent battery into the row at one end causing a charged battery to be automatically dispensed from the other end of such row. The device is thus maintained full of batteries at all times.

An additional object of the invention is to provide a device, for the purpose described, which includes a guideway in which the row of batteries is disposed, with the batteries progressing in the guideway upon spent batteries being introduced into the row at said one end and charged batteries dispensed from the row at said other end; there being a charging circuit having a novel contact assembly associated with the guideway and operative to maintain—irrespective of their progressive positions—all of the batteries, of the row, in said circuit.

It is also an object of the invention to provide a battery receiving, charging, and dispensing device which is designed for ease and economy of manufacture and convenience of use; the device being compact and especially suited for—but not limited to—wall mounting for ready access.

A still further object of the invention is to provide a practical, reliable, and durable battery receiving, charging, and dispensing device, and one which will be exceedingly effective for the purpose for which it is designed.

These objects are accomplished by means of such structure and relative arrangement of parts as will fully appear by a perusal of the following specification and claims.

In the drawings:
FIG. 1 is a perspective view of the device.
FIG. 2 is an enlarged side elevation of the device; the view being mainly in section, with certain of the parts broken away.
FIG. 3 is a sectional elevation on line 3—3 of FIG. 2, with certain of the parts broken away.
FIG. 4 is a cross section taken on line 4—4 of FIG. 3.

Referring now more particularly to the drawings, and to the characters of reference marked thereon, the device comprises an upstanding elongated housing, indicated generally at 1; such housing—which is rectangular in horizontal section—being open at the bottom and including a front 2, sides 3, and a back 4, and a top 5.

Intermediate its ends the front 2 is formed with a forward offset 6 whereby the housing 1—in the top portion—is increased in front to rear depth, and so as to provide a chamber 7 for a package-type battery charging unit 8, with such unit disposed forwardly clear of the full-length vertical enclosure 9 defined by the remainder of the housing 1.

A vertically elongated, battery receiving guideway 10 is disposed in the enclosure 9, and extends from the bottom thereof upwardly to an upper end termination adjacent but short of the top 5; the distance between the upper end of the guideway 10 and the top 5 being greater than the diameter of the batteries which the device is adapted to receive.

The guideway 10, which is open both top and bottom, comprises dielectric side plates 11 disposed in adjacent but spaced facing and parallel relation to the sides 3 of the housing 1; such side plates 11 being connected by out-turned vertical channels 12 which span between corresponding vertical edge portions of said side plates 11, the flanges of said channels being indicated at 13.

The guideway 10 is mounted and maintained in position, within the housing 1, by means of vertically spaced bolts 14 which extend through the sides 3 and connect to said guideway 10, passing through the dielectric side plates 11 and being threaded into the flanges 13. Spacer or standoff sleeves 15 surround the bolts 14 between the sides 3 and the plates 11.

With the guideway 10 so mounted in the housing 1 not only are the side plates 11 spaced from the sides 3, but space also exists between the edges of said side plates and the front 2 and back 4 of housing 1.

At its lower end the housing 1 is formed with a full-width, channel-like chute 16 which extends at a forward and downward incline from the lower edge of the back 4; such chute 16, at the bottom thereof, being provided with an upturned catch lip or trough 17.

The batteries are each indicated at 18, and a multiplicity thereof—in a vertical row, as shown—fills the guideway 10 from top to bottom; the batteries extending horizontally or transversely in such guideway between the dielectric side plates 11. The batteries 18 in the vertical row are thus disposed in side to side engagement, and such batteries all face in the same direction; i.e., the center posts or terminals 19 of all of such batteries project in the same direction or toward the same dielectric side plate 11.

The lowermost battery 18 in the guideway 10 is normally maintained against downward displacement or dispensing by means of a horizontally yieldable, battery retention rod 20 that extends transversely between the dielectric side plates 11 in a normal position that engages such lowermost battery 18 beneath the same but laterally offset from dead-center. The battery retention rod 20 projects, at its ends, through horizontal slots 21 in the side plates 11; such slots extending from their inner ends forwardly and in a direction away from the bottom dead-center of the lowermost battery 18 in the guideway.

The ends of the battery retention rod 20 are disposed outwardly of the corresponding dielectric side plates 11 and are there connected to tension springs 22 that extend rearwardly to attachment with the dielectric side plates 11, as at 23.

With the foregoing arrangement the battery retention rod 20 normally supports the lowermost battery 18 against downward discharge or dispensing, but is forwardly yieldable to permit such lowermost battery to escape the guideway and deliver into the chute 16.

The guideway 10 is encompassed from above by a vertically elongated, generally U-shaped yoke, indicated generally at 24; such yoke including a top presser plate 25 that normally closes the upper end of guideway 10, and flat depending legs 26 slidably engaged in the out-turned channels 12.

Tension springs 27 are connected between the lower ends of the yoke legs 26 and attachment ears 28 secured in the channels 12 at a point such that said springs are still under tension when the yoke 24 is in its lowermost position, with the top plate 25 closing the upper end of the guideway 10.

Centrally thereof the top plate 25 is formed with an upstanding boss 29, and a pull-push rod 30 is secured axially to such boss and thence extends upwardly through an opening 31 in the top 5 of housing 1; the rod 30 above said top 5 being fitted with a finger knob 32. By grasping the finger knob 32 and pulling upwardly, the yoke 24 can be raised, whereby to shift the top plate 25 upwardly into engagement with the under side of top 5. In this position of the yoke one of its open sides at the top portion thereof is in register with a circular battery insertion opening 33 formed in the adjacent side 3 of housing 1 immediately adjacent the top thereof.

Thus, with the yoke 24 so raised, a spent battery 18 may be inserted through the opening 33 and into the upper portion of said raised yoke; the battery being stopped in proper position by means of an upward extension 11a of the side plate 11 remote from said opening 33.

Thereafter—under the influence of the tension springs 27, aided if necessary by downward pushing on the finger knob 32—the yoke 24 is returned to its lowered position, forcing such inserted battery downward into the upper end of the guideway 10. Such action shifts the entire row of batteries 18 downwardly in such guideway, with the result that the lowermost battery—under the pressure from above—causes the battery retention rod 20 to yield forwardly, permitting such lowermost battery to escape into the chute 16 and roll therein down to the catch trough 17 for convenient manual access and removal.

Immediately upon each battery being so dispensed, the rod 20 snaps back to engage the next following battery so as to then support it and those in the row thereabove.

In this manner the individual batteries progress from top to bottom of the row thereof in the guideway 10, being charged during such progression in the following manner:

As previously described, the batteries 18—in the row thereof in the guideway 10—all face in the same direction; i.e., are disposed so that the center posts or terminals 19 of such batteries extend toward the same one of the dielectric side plates 11. Such one side plate 11 is provided, centrally of its edges, with a vertical row of spring contacts 34 corresponding in number to the batteries 18 in the row; such spring contacts 34 being vertically spaced so that each normally rests in electrical engagement with the corresponding center post or terminal 19 of the related battery.

The other dielectric side plate 11 is provided, on its inner face, with a like row of vertically spaced spring contacts 35, each of the latter bearing in electrical engagement with the exposed metallic bottom of the related or adjacent battery 18.

The battery charging unit 8, which is energized through the medium of an electric current supply cord 36, includes a pair of output or charging leads, indicated at 37 and 38.

The lead 37 extends from the battery charging unit 8 to connection with the uppermost one of the spring contacts 34, while the lead 38 extends to connection with the lowermost one of the spring contacts 35.

Starting with the uppermost spring contact 35, jumper wires 39 connect between each of such contacts 35 and the next lowermost contact 34. Thus, with the leads 37 and 38, together with the jumper wires 39, connected as described, all of the batteries 18 in the guideway 10 are electrically connected in series relative to the battery charging unit 8; it being desirable—because of the characteristics of such unit—that the batteries be charged in series.

With the above described battery charging circuit, including the battery engaging contacts 34 and 35 mounted and connected as described, the batteries in the row are effectively charged as they progress downwardly toward ultimate dispensing from the lower end of the guideway 10.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. A receiving, charging, and dispensing device for rechargeable flashlight type batteries, comprising an upstanding elongated housing, an elongated open-ended vertical guideway secured in the housing, the guideway being adapted for the reception of a multiplicity of such batteries each disposed horizontally transversely of the guideway and contacting each other to form a vertically movable row, means associated with the housing and guideway for relatively forcefully introducing into the latter a spent battery at the upper end of the row, means in the guideway normally but yieldably supporting the lowermost battery of the row, said row moving and the batteries progressing downwardly in the guideway upon such introduction thereinto of a spent battery, the supporting means yielding and said lowermost battery dispensing from the guideway upon such movement of the row, such dispensed battery being accessible from exteriorly of the housing, and means incorporated in the device to charge the batteries as the latter progress downwardly in the guideway; the means for introducing a battery into the guideway comprising an inverted generally U-shaped yoke slidably straddling the guideway from above, said yoke including depending legs and a cross plate normally substantially resting on the upper end of the guideway and then engaging the topmost battery in the row, spring means connected to the legs and yieldably resisting upward sliding of the yoke, the housing having a top and a side, the upper end of the guideway terminating a distance below said top, hand actuated means in part exteriorly of the housing operative to slide the yoke upwardly a distance to permit reception of a spent battery horizontally in a position between the upper end of the guideway and the cross plate, and the side of the housing having an opening for insertion of a spent battery and into said position; lowering of the yoke then causing the cross plate to push said spent battery into the guideway.

2. A receiving, charging, and dispensing device for rechargeable flashlight type batteries, comprising a guideway for the reception of a multiplicity of such batteries engaged with each other in a longitudinally movable row, the row moving and the batteries progressing in the guideway upon introduction into the latter of a spent battery at one end of the row, means permitting the introduction of batteries into the guideway at said one end thereof only, such progression of the batteries causing dispensing from the guideway of the battery at the other end of the row, the batteries extending transversely of the row in side-by-side engagement, a battery charging unit mounted in the device and including a charging circuit, contacts in the guideway positioned to engage the terminal ends of the batteries in any progressive position thereof and connected to the charging circuit; the contacts being spring strips extending lengthwise of the guideway and secured at their ends nearest said one end of the guideway and sloping thence toward each other in the direction of the other end of the guideway, and means at said other end of the guideway releasably holding the adjacent battery of the row in position to maintain all the batteries engaged with contact strips.

3. In a device for receiving, charging and dispensing rechargeable flashlight type batteries, a housing, an upstanding elongated guideway in the housing for a predetermined number of such batteries disposed horizontally and in contact in a vertically movable row, means for recharging the batteries of the row while in the guideway, a presser plate normally engaging the tpomost battery in the row, means mounting the plate for upward movement from said battery engaging position a distance greater than the diameter of a battery, a spring resisting such upward movement of the plate, the housing having a battery-entry opening in one side between the position of the topmost battery of the row and the topmost position of the plate, the lower end of the guideway being open for the escape of a battery, yieldable means normally engaging the lowermost battery of the row and preventing such escape unless an inserted battery is engaged by the presser plate, and hand means to lift the plate against the resistance of the spring; said last named means comprising a push-pull rod projecting upwardly from the plate past the entry opening and through the top of the housing for manipulation.

References Cited by the Examiner

UNITED STATES PATENTS

| | | | |
|---|---|---|---|
| 1,117,148 | 11/14 | Amberg et al. | 221—66 X |
| 1,620,178 | 3/27 | Warwick et al. | 221—66 |
| 1,684,863 | 9/28 | Grant | 194—97 |
| 2,119,063 | 5/38 | Wagner | 221—2 X |
| 2,173,736 | 9/39 | Thomas | 320—2 |
| 2,424,059 | 7/47 | Scott | 320—4 |
| 2,622,233 | 12/52 | Field | 320—2 |
| 2,893,599 | 7/59 | Kay | 221—281 X |

LOUIS J. DEMBO, *Primary Examiner.*

LLOYD McCOLLUM, KENNETH N. LEIMER,
*Examiners.*